United States Patent [19]
Robinson

[11] 3,915,609
[45] Oct. 28, 1975

[54] MOLDS FOR CASTING SILICONE RUBBER CONTACT LENSES

[75] Inventor: Charles C. Robinson, Sturbridge, Mass.

[73] Assignee: American Optical Corporation, Southbridge, Mass.

[22] Filed: Mar. 18, 1974

[21] Appl. No.: 452,176

[52] U.S. Cl. ........ 425/174.6; 425/174.8 E; 425/385; 425/412; 425/808; 264/1
[51] Int. Cl.² ...................... B29D 11/00; B29C 3/00
[58] Field of Search .......... 425/174.6, 174.8 E, 808, 425/385, 412; 264/1

[56] References Cited
UNITED STATES PATENTS

| | | | |
|---|---|---|---|
| 2,332,674 | 10/1943 | Smith | 425/808 X |
| 2,432,668 | 12/1947 | Kingston | 264/1 |
| 2,532,501 | 12/1950 | Johnson | 264/1 X |
| 2,635,289 | 4/1953 | Owens | 264/1 X |
| 2,640,227 | 6/1953 | Johnson | 264/1 |
| 3,093,447 | 6/1963 | Crandon | 264/1 |
| 3,221,083 | 11/1965 | Crandon | 264/1 |
| 3,454,685 | 7/1969 | Roy et al. | 264/1 |
| 3,454,686 | 7/1969 | Jones | 425/174.8 E |

Primary Examiner—Robert L. Spicer, Jr.
Attorney, Agent, or Firm—Albert H. Graddis; Frank S. Chow

[57] ABSTRACT

A mold for casting contact lenses from an unpolymerized resin such as silicone gum wherein the resin is polymerized by high energy radiation such as an electron beam. One side of the mold is a cap capable of transmitting radiation, which is positioned by a mandrel while the resin is being cast. The mandrel is removed while radiation is applied. Silicone contact lenses cured have substantially greater flexibility at the periphery than at the center may be produced by decreasing the amount of radiation applied to the periphery of the lens.

13 Claims, 6 Drawing Figures

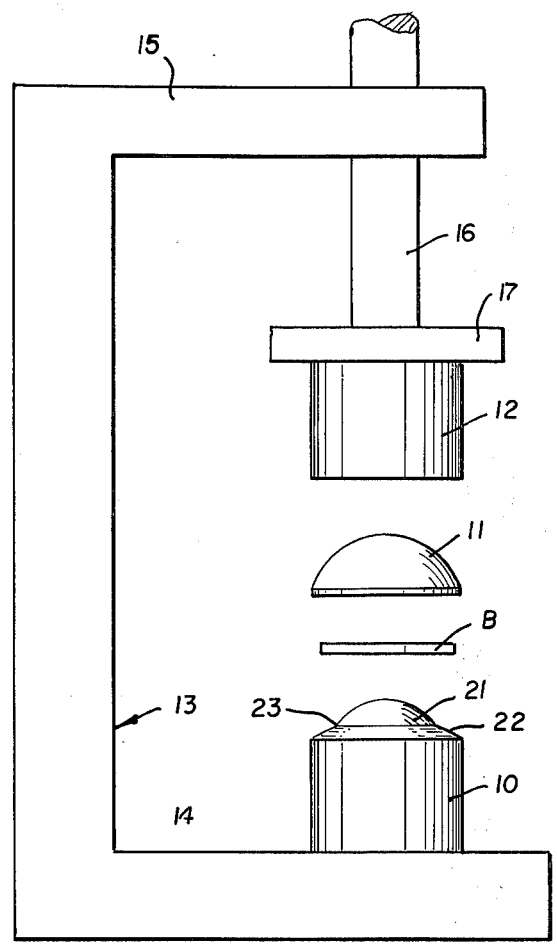
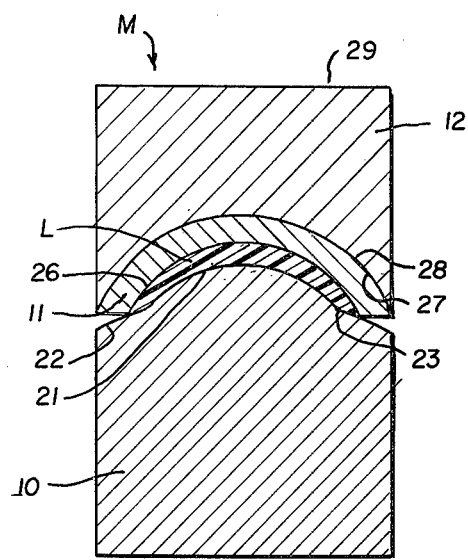
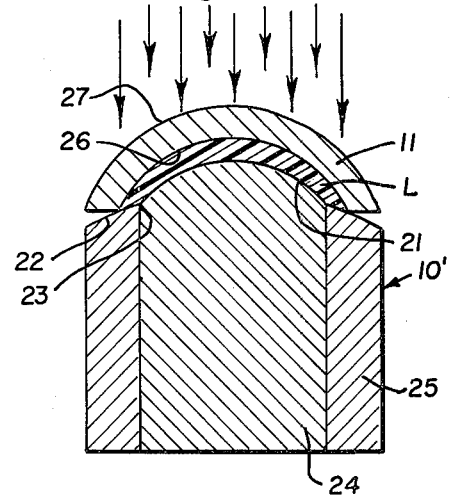
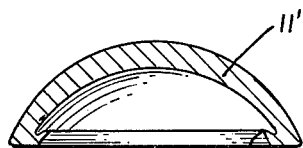
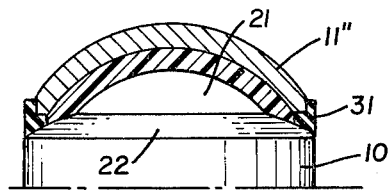
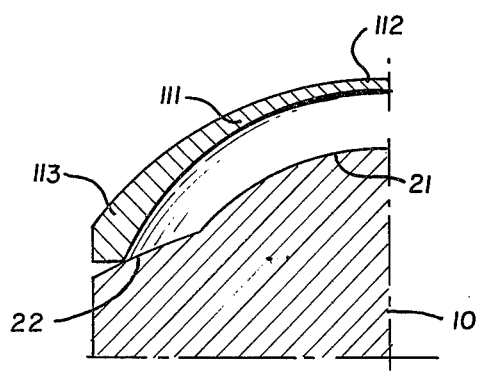

MOLDS FOR CASTING SILICONE RUBBER CONTACT LENSES

FIELD OF INVENTION

Molds for the casting of contact lenses which are formed of a resin polymerized within the mold, and especially for the casting of plastic contact lenses of the type which are considered as "soft lenses" and methods of casting soft contact lenses.

DESCRIPTION OF THE PRIOR ART

The prior art includes one piece and two piece molds for receiving a charge of resin, shaping the resin to the desired form, such as a lens blank, and thereafter permitting or effecting polymerization or setting thereof. Resins which from hydrogels, such as mono and dimethacrylates are prepared by evaporation of swelling agents such as water. Resins such as, for example, glycol carbonate and vinyl type monomer mixtures and silicone gums are conventionally polymerized by heat. Resins, such as silicone gums, can also be polymerized by high energy electron radiation but this has not been practical with the use of conventional two-piece molds since the molds shield the resin within them from such radiation. The U.S. patent to H. D. Crandon, No. 3,221,083, issued Nov. 30, 1965, discloses a typical two-piece mold. A pair of mold halves, male and female sections, are held in a clamp between a base and a platen moveable toward the base. A resin gum is placed in this mold, pressure formed and the mold then placed in an oven and heated to polymerize it to any desired rigidity.

A major disadvantage in the use of a conventional mold wherein polymerization or setting of the lens occurs, resides in the fact that a substantial amount of time is required to complete a desired forming and polymerization operation. Where heat is to be applied, the heating of the mold to the selected temperature for polymerizing the resin is a time consuming step in and of itself. Such heating must be slow to bring the resin within the mold to the proper temperature.

SUMMARY OF THE INVENTION

It is known that resins, such as silicone gums, can be very effectively and quickly polymerized with high energy radiation, and one embodiment of the present invention provides for a mold to produce a soft contact lens of silicone rubber by polymerizing selected silicone gums within the mold with a high energy electron beam. The mold according to the present invention consists of three components. The first component is a base section which is preferably a male mold to form the posterior side of the lens and will be ordinarily contoured according to a specified prescribed corneal curvature. The second component, the cap, is adapted to overlay the base section and is preferably a thin walled female mold cavity to form the anterior side of the lens. The cap is contoured according to a specified, prescribed curvature, which may parallel the posterior side of the lens so the surface may be subsequently ground according to prescription. The third component is a mandrel having an undersurface which fits snugly against the cap for holding and supporting the thin wall cap during the molding operation. The base and the mandrel when together form a cylinder to fit between the anvil and platen of a press wherein the lens is cast. Once the resin, such as the silicone gum, is cast within this mold, the mandrel is removed and the lens is subjected to a high energy radiation, an electron beam, of sufficient intensity as to easily pass through the cap for a period of time sufficient to cure the resin.

ADVANTAGES OF THE INVENTION

One advantage of the invention is to provide a novel and improved mold for casting and curing a contact lens from a resin such as a silicone gum which can receive a high energy electron beam directed into the gum to cure the resin while it is in the mold.

Another advantage of the invention, resulting in polymerizing the resin, such as a silicone gum, with a high energy electron beam, resides in the short time period required to effect the polymerization of the resin as compared with heating steps to produce a finished lens in a short time and with reduced costs.

Another advantage of the invention is to provide a novel and improved mold for casting resin gums and the like for polymerization of the same with a high energy electron beam by using a cap through which the beam passes, whose thickness may be selectively proportioned to actually control the degree of polymerization at various areas on the lens, and specifically attain a soft contact lens of silicone rubber which is more resilient about the edges, where resiliency is needed, than at the center, where rigidity is more desirable.

Another advantage of the invention, wherein a soft contact lens of a silicone rubber gum is quickly polymerized with a high energy electron beam, resides in the attainment of close tolerances in the finished product which will require a minimum of subsequent operations to finish the lens.

Accordingly, the present invention comprises certain constructions, combinations and arrangements of parts and elements and sequences and steps as hereinafter described, defined in the appended claims and illustrated diagrammatically in the accompanying drawings in which:

FIG. 1 is an exploded side elevational view of the components forming the improved mold with a blank of a resin material positioned between the mold components and with the components set in their relative position in a press.

FIG. 2 is a transverse sectional view of the mold components pressed together to form the blank of resin material into a lens.

FIG. 3 is a transverse sectional view of the lower sections of the mold removed from the press and with arrows symbolically indicating the direction of electron beam radiation striking the mold to penetrate and to cure the resin within the mold.

FIG. 4 is a transverse sectional view of a modified form of a mold cap used in the mold.

FIG. 5 is a transverse sectional view similar to FIG. 3, but showing the use of a gasket between the mold sections to facilitate forming a lens blank.

FIG. 6 is a fragmentary portion of a mold cap somewhat similar to the mold cap shown in FIG. 3, but on a greatly enlarged scale to illustrate variations in thickness of the wall of the cap for control of the degree of radiation which will be applied to the edges and the center of a lens being cured within the mold.

DESCRIPTION OF A PREFERRED EMBODIMENT

The present invention may be used in the manufacture of various small articles which are to be made of resin such as silicone gum, and which is to be cured by an electron beam or other high energy radiant source while the resin is in the mold forming the article. However, one preferred use of the invention resides in the manufacture of soft contact lenses and for partially finished blanks of such lens. The molds to form these lenses or blanks therefor will be precisely machined so that the lenses or blanks therefor will be very close to, if not at, the final prescription dimensions and a minimum of subsequent finishing operations will be required. While various resins can be used to make soft contact lenses according to the present invention, the preferred types are silicone gums which are cured by cross-linking to form silicone rubbers and thus, the following description will refer to the resin as being such.

Referring more particularly to the drawing, the improved mold M consists of a base 10, a cap 11 which overlies the base, and a mandrel 12 which overlies the cap and holds the cap in position upon the base. A blank B of silicone gum, indicated at FIG. 1, is placed between the base 10 and cap 11 and the mold components are then brought together as in a press 13 to shape the blank B into a lens L as indicated at FIG. 2. The press 13 includes an anvil 14 whereon the mold base 10 is mounted. The Press 13 also includes an arm 15 spaced above the anvil which carries a plunger rod 16 directed downwardly toward the base. A platen 17 holds the mandrel 12 above the mold base 10 on the anvil and these mold components are held by the press in precise axial alignment with each other. The mold axes are also coincident with the axis of the plunger rod 16. The mold components, the base 10, the cap 11 and the mandrel 12 will thus join in a uniform, balanced manner to an essentially perfect registration and when the lens L is preformed in this mold, excess material from the blank B is squeezed out of the mold in all directions to produce a lens having a very precise form.

The complete mold M forms an upright cylinder when the components are joined and the base 10 is thus a cylindrical block having a planar undersurface 20 adapted to cooperate with anvil 14 in a manner to precisely locate base 10. If necessary, the anvil may be socketed or otherwise adapted to hold the base in place. This base 10 is formed of a rigid, inert durable material such as stainless steel, glass or amorphous quartz which are inert to the action of silicone gum or other resin molded.

The top surface of this base forms the male portion of the mold and as such, the surface will be contoured to duplicate the predetermined curvature adapted to fit the eye. Accordingly, a central portion 21 of the mold surface is essentially spherical and corresponds to the shape of the cornea. An outer portion 22 surrounding this central cornea portion is shaped to provide a peripheral portion with an appropriate curvature as well known to those skilled in the art. The two portions join at an edge 23 which may coincide with the edge of the cornea or limbus which is preferably rounded on a slight radius to produce a smooth-surface casting without any sharp corners thereon. In the manufacture of this base section 10, the two mold portions may be formed by an integral, cylindrical block of material as indicated at FIG. 2, or the base may be two parts, a central core 24 having an end forming the central mold portion 21 and a cylindrical sleeve about this core having an end forming the outer mold portion 22 as illustrated for the base 10' at FIG. 3.

The cap 11 is a body with a dish-shaped recess and an external diameter which may be the same as the diameter of the base 10. The under concave surface 26 of the cap 11 will overlie the mold surfaces of the base 10 and this concave surface will form the outer convex, anterior surface of a lens cast in the mold. As such, the surface is usually spherical and it may be formed on a radius according to a selected lens prescription or this surface may parallel the mold surface of the base 10 to produce a lens blank which can be subsequently turned to prescription on a lathe.

This cap 11 is formed of a rigid, inert, durable, preferably stainless steel, but it may be of quartz or glass or the like. The cap has a thickness selected to permit a high energy electron beam, such as that generated by a Van de Graaff generator, to pass through the cap without excessive loss of energy by a shielding action of the cap but preferably causing sufficient dispersion of the beam to provide very uniform radiation. The cap should be thin enough to pass an electron beam of sufficient intensity into the resin to polymerize the same quickly and before the mold can become heated to an excess temperature. The thickness of the cap should be such, however, as to scatter the electrons passing through it sufficiently to permit an optimum cross-linking of gum in the cavity. It was found that if the cap were made of stainless steel and the beam has an energy level of 3.5 MeV the thickness of the wall should preferably be about one millimeter, although such is not critical to provide polymerization times of about 5 to 120 seconds, and preferable 15 to 30 seconds. Variations of thickness of 0.5mm to 5mm, and usually 0.5mm to 2mm will not significantly affect the polymerization of the gum within the mold cavity when it is subjected to an electron beam, although the time required to polymerize will vary substantially. Large variations or changes of thickness, such as an increase of thickness to two millimeters or more will increase the necessary exposure time when the resin is exposed to the beam of a Van de Graaff generator. The comparative preferred thickness of quartz and glass was found to be preferably about three millimeters for the same energy level and could vary from 1mm to 15mm in thickness, and usually about 1mm to 10mm.

The upper surface 27 of the cap 11 is also spherical and its radius is established by the desire for a substantially uniform wall thickness of the cap. It is to be noted that with the spherical upper surface of the cap and a correlated spherical undersurface, the thickness of material through which an axially directed electron radiation must pass, as indicated by the arrows at FIG. 3, will vary and the wall will be comparatively thicker near the edge of the cap than at the center. However, unless the lens curves are quite steep, this variation is not significant.

The mandrel 12 carries cap 11 when a blank B of silicone gum is to be shaped into a lens L and the undersurface 28 of the mandrel is thus concavely contoured and shaped to correspond to the exterior surface 27 in order to receive and snugly hold the upper convex surface of the cap as best shown in FIG. 2. An easily removable adhesive may be used to hold the cap 11 in place if desired, but is not essential. This mandrel 12 is preferably a cylindrical member of any suitable rigid material, such as metal, and its upper surface 29 is adapted to be held in position against the platen 17 of the press in axial alignment with the base 10. The manner in which the mandrel 12 is held is not shown, but it may be fitted to the platen 17 in any suitable manner, as by bolting or even with an adhesive.

In using the apparatus above described, the mold M is first mounted in the press 13 with the base 10, cap 11 and mandrel 12 being carefully aligned with respect to each other and with the cap fitted in the mandrel. A blank B of silicone gum is then placed between the base and the cap. Next pressure is applied by the press to form a lens L from the blank B as illustrated at FIG. 2. The mold is then removed from the press and the mandrel is removed from the cap, the cap remaining upon the base to hold the lens in position. Next, the mold is placed in a Van de Graaff electron beam generator, and an electron beam with an energy of about 3.5 MeV is directed against the cap 11. The electron beam is directed axially downward, against and through the cap as shown by the arrows of FIG. 3. The radiation is applied for a selected brief period of time sufficient to polymerize the lens to a selected hardness. This time period may be in the range of 30 seconds, but such may vary considerably depending upon the intensity of radiation, thickness of the mold, and particular silicone resin. In any event, the desired time period can be easily established by a few trial tests. Finally, the completed lens is removed from the mold.

Certain variations are possible in this mold construction. FIG. 4 illustrates a modified cap 11' which is undercut at its edges, as at 30, to provide a preformed rounded edge on a lens and chamfer at the edge of the posterior surface of the lens made in the mold. A rounded edge and chamfer are desirable on a finished lens, and this permits the lens to be cast in its final form or as near to the final form as possible. When a lens is so formed, it will be locked in the mold; however, it may be freed from the mold by the use of an air jet played against the edge of the mold. Also, the cap may be made into separable sections to accomplish the same purpose.

The cap 11'' at FIG. 5 illustrates the use of a rubber gasket 31 about the periphery of the mold. The gasket 31 yields when a lens is formed by the pressure exerted by the press 13 and thereby producing a rounded edge.

As heretofore noted, significant changes in the thickness of the wall of the cap will require changes in the time of radiation exposure and it is apparent that this may be used to advantage where it is desirable to cure the lens in a non-uniform manner. FIG. 6 illustrates in a somewhat diagrammatic manner portions of the base 10 and cap 111 upon the base to form a mold cavity between them. The wall of the cap 111 is varied in thickness from a minimum thickness 112 at the center of the cap to a maximum thickness 113 at the peripheral edge of the cap. The additional thickness at the outer edge of the cap will reduce the radiation intensity applied to the lens near the edge and provide for a finished lens which will be comparatively hard and dimensionally stable at the center portion, but softer and more flexible about the peripheral edges where a soft flexible edge is very desirable for comfort of lens wearers. This procedure permits a gradual change in rigidity without the sharp change required by the prior art.

The foregoing disclosure and the variations noted are exemplary of the invention and I desire that my protection be limited, not by the detail of description, but only by the scope of the appended claims.

What is claimed is:

1. Molding apparatus for sequentially shaping and curing a contact lens of a silicone resin with a high energy particle beam which comprises:
   a. a first mold member having a molding surface,
   b. a second mold member having a molding surface defining a mold cavity in cooperation with said first mold member, said second mold member having a surface exterior to said mold casting and spaced from said molding surface thereof and being constructed of a material transmitting the high energy particle beam, a material thickness between molding and exterior surfaces being selected to provide transmission of sufficient energy from said particle beam to cause said resin to polymerize,
   c. a detachable mount for said second mold member having a recess complementary to said exterior surface, said mount providing support for said second mold member during said shaping of the contact lens and being detachable from the second mold member to permit curing the shaped contact lens by exposure to the high energy particle beam through said second mold member.

2. The apparatus of claim 1 wherein said first mold member is a male member and the second mold member is a female member.

3. The apparatus of claim 1 further including means for generating a high energy electron beam.

4. The apparatus of claim 3 wherein said means is a Van de Graaff generator.

5. The apparatus of claim 1 further including a gasket member positioned between said first and second mold members to shape the edge of said contact lens.

6. The apparatus of claim 1 wherein said second mold member is metal.

7. The apparatus of claim 6 wherein the metal is stainless steel, the thickness is about 0.5 to 2.0 mm. and the particle beam has an energy level of about 3.5 MeV.

8. The apparatus of claim 1 wherein the second mold member is fused quartz.

9. The apparatus of claim 8 wherein the thickness is about 1 to 10mm. and the particle beam has an energy level of about 3.5 MeV.

10. The apparatus of claim 1 wherein the second mold member is glass.

11. The apparatus of claim 10 wherein the thickness is about 3mm. and the particle beam has an energy level of about 3.5 MeV.

12. The apparatus of claim 1 wherein the thickness of the second member is greater in one portion than the remainder of said second member.

13. The apparatus of claim 1 wherein the thickness at the peripheral portion of the cavity is greater than the thickness at the center of the lens.

* * * * *